(12) United States Patent
Simonsen et al.

(10) Patent No.: US 7,070,820 B2
(45) Date of Patent: Jul. 4, 2006

(54) COATED PARTICLES CONTAINING AN ACTIVE

(75) Inventors: Ole Simonsen, Soborg (DK); Poul Bach, Birkerod (DK)

(73) Assignee: Novozymes A/S, Bagsraerd (DK)

( * ) Notice: Subject to any disclaimer, the term of this patent is extended or adjusted under 35 U.S.C. 154(b) by 177 days.

(21) Appl. No.: 09/966,949

(22) Filed: Sep. 28, 2001

(65) Prior Publication Data

US 2002/0081738 A1    Jun. 27, 2002

Related U.S. Application Data

(60) Provisional application No. 60/239,005, filed on Oct. 6, 2000.

(30) Foreign Application Priority Data

Oct. 2, 2000    (DK) .............................. 2000 01460

(51) Int. Cl.
C11D 3/386    (2006.01)
C11D 7/42     (2006.01)

(52) U.S. Cl. ..................... 426/96; 426/98; 426/549; 426/561; 428/402; 428/403; 510/530

(58) Field of Classification Search .................. 426/98, 426/99, 96, 94, 61, 549, 561, 653, 391; 510/218, 510/220, 349; 427/212; 428/402, 403
See application file for complete search history.

(56) References Cited

U.S. PATENT DOCUMENTS

| 4,022,917 A | * | 5/1977 | Selenke ....................... 426/331 |
| 4,094,685 A | * | 6/1978 | Lester et al. .................. 521/76 |
| 5,876,793 A | * | 3/1999 | Sherman et al. ............. 427/213 |
| 6,248,378 B1 | * | 6/2001 | Ganan-Calvo ............... 426/89 |
| 6,251,478 B1 | * | 6/2001 | Pacifico et al. ........... 427/213.3 |
| 6,617,026 B1 | * | 9/2003 | Bach ........................... 428/402 |

FOREIGN PATENT DOCUMENTS

| JP | 11-197494 | * | 7/1999 |
| WO | 99/27063 | * | 6/1999 |
| WO | 01/24990 | | 4/2001 |
| WO | 01/25322 | | 4/2001 |
| WO | 01/25323 | | 4/2001 |

\* cited by examiner

*Primary Examiner*—Keith Hendricks
(74) *Attorney, Agent, or Firm*—Elias J. Lambiris

(57) ABSTRACT

The present invention relates to coated particles comprising a coating and a core particle comprising an active, wherein the coating comprises a gas phase component. The invention also relates to processes for the manufacture of such coated particles comprising (a) providing a coating material comprising a gas phase component and applying the gas containing coating material to a core particle or (b) providing a coating material comprising a gas generating component, applying the coating material to a core particle and treating the coated particles so as to generate a gas from the gas generating component. Furthermore, it also relates to the use of such coated particles in a number of applications.

17 Claims, No Drawings

COATED PARTICLES CONTAINING AN ACTIVE

CROSS-REFERENCE TO RELATED APPLICATIONS

This application claims, under 35 U.S.C. 119, priority or the benefit of Danish application No. PA 2000 01460 filed Oct. 2, 2000, and U.S. provisional application No. 60/239,005 filed Oct. 6, 2000, the contents of which are fully incorporated herein by reference.

FIELD OF THE INVENTION

The present invention relates to coating materials for coating particles containing an active. Said coating materials comprise a gas phase component and serve both the purpose of regulating density of the particles and protect the particle from damage by being able of absorbing impacts on the particle. The invention also relates to processes for the manufacture of such coated particles, such as a process where a coating feed comprising a gas phase component, a coating material and optionally a solvent is pressurised before entering a coating chamber. Furthermore, the invention relates to the use of such coated particles in a number of applications.

BACKGROUND OF THE INVENTION

It is known to the art to incorporate actives such as enzyme into dry solid particles or granules and thereby protect the active from inactivation and/or protect the environment the active. Such particles or granules have usually been applied to other dry products such as dry granular detergent compositions to improve their performance. Enzymes are an example of an active, which may be incorporated in dry solid particles or granules.

Known enzyme granule formulation technologies include:

a) Spray dried products, wherein a liquid enzyme-containing solution is atomised in a spray drying tower to form small droplets which during their way down the drying tower dry to form an enzyme-containing particulate material. Very small particles can be produced this way (Michael S. Showell (editor); *Powdered detergents*; Surfactant Science Series; 1998; vol. 71; page 140–142; Marcel Dekker).

b) Layered products, wherein the enzyme is coated as a layer around a pre-formed inert core particle, wherein an enzyme-containing solution is atomised, typically in a fluid bed apparatus wherein the pre-formed core particles are fluidised, and the enzyme-containing solution adheres to the core particles and dries up to leave a layer of dry enzyme on the surface of the core particle. Particles of a desired size can be obtained this way if a useful core particle of the desired size can be found. This type of product is described in e.g. WO 97/23606.

c) Absorbed core particles, wherein rather than coating the enzyme as a layer around the core, the enzyme is absorbed onto and/or into the surface of the core. Such a process is described in WO 97/39116.

d) Extrusion or pelletized products, wherein an enzyme-containing paste is pressed to pellets or under pressure is extruded through a small opening and cut into particles which are subsequently dried. Such particles usually have a considerable size because of the material in which the extrusion opening is made (usually a plate with bore holes) sets a limit on the allowable pressure drop over the extrusion opening. Also, very high extrusion pressures when using a small opening increase heat generation in the enzyme paste, which is harmful to the enzyme. (Michael S. Showell (editor); *Powdered detergents*; Surfactant Science Series; 1998; vol. 71; page 140–142; Marcel Dekker)

e) Prilled products, wherein an enzyme powder is suspended in molten wax and the suspension is sprayed, e.g. through a rotating disk atomiser, into a cooling chamber where the droplets quickly solidify (Michael S. Showell (editor); *Powdered detergents*; Surfactant Science Series; 1998; vol. 71; page 140–142; Marcel Dekker). The product obtained is one wherein the enzyme is uniformly distributed throughout an inert material instead of being concentrated on its surface. Also U.S. Pat. Nos. 4,016,040 and 4,713,245 are documents relating to this technique f) Mixer granulation products, wherein an enzyme-containing liquid is added to a dry powder composition of conventional granulating components. The liquid and the powder in a suitable proportion are mixed and as the moisture of the liquid is absorbed in the dry powder, the components of the dry powder will start to adhere and agglomerate and particles will build up, forming granulates comprising the enzyme. Such a process is described in U.S. Pat. No. 4,106,991 (NOVO NORDISK) and related documents EP 170360 B1 (NOVO NORDISK), EP 304332 B1 (NOVO NORDISK), EP 304331 (NOVO NORDISK), WO 90/09440 (NOVO NORDISK) and WO 90/09428 (NOVO NORDISK). In a particular product of this process wherein various high-shear mixers can be used as granulators, granulates consisting of the enzyme, fillers and binders etc. are mixed with cellulose fibers to reinforce the particles to give the so-called T-granulate. Reinforced particles, being more robust, release less enzymatic dust (vide infra).

Known enzyme formulations are to day either "dry formulations", i.e. consisting of agglomerates of solid particles or "liquid formulations", i.e. liquids containing solutions or suspensions of enzymes/enzyme particles.

WO 01/25322 disclose a foam component, which comprises a mixture of a polymeric material, a dissolution aid and an active ingredient.

WO 01/24990 disclose a process for preparing a foam component, said process comprises the steps of extruding a viscous mixture from a rotating extrusion plate onto a receiving surface.

WO 01/2632 disclose elastic articles comprising a polymeric material and an active ingredient.

SUMMARY OF THE INVENTION

An object of the present invention is to provide improved coated particles containing an active, such as an enzyme. When preparing particles containing an active one object is to separate the active from their surroundings until the moment when they are to be used in an application. Another object for incorporating the active in a particle is to lower the amounts of potentially harmful active dust which may be generated from the active.

Furthermore, we have found that as particles normally are sold by the amount of activity per weight of preparation it is desirable to apply light coatings so that the active will account for the majority of weight thereby providing high active contents particles.

Accordingly an object of the invention is to provide a light weight coating which lowers the dust formation from the coated particles and at the same time lowers the overall true density of the coated particles.

The present invention provides a coated particle comprising a coating and a core particle comprising an active, wherein the coating comprises a gas phase component and wherein the coating and the method of preparing the coated particle possesses the desired properties.

The invention also provides methods for preparation of the coated particles and compositions comprising the coated particles and their use.

Another aspect of the invention is to provide a method for preparing the coated particle of the invention comprising a step selected from (a) providing a coating material comprising a gas phase component and applying the gas containing coating material to a core particle or (b) providing a coating material comprising a gas generating component, applying the coating material to a core particle and treating the coated particles so as to generate a gas from the gas generating component.

Another aspect is also to use compositions comprising the coated particle of the invention for cleaning an object and for improving a dough.

DETAILED DESCRIPTION OF THE INVENTION

When handling solid particles comprising an active, one of the major problems is the formation of dust from the active, which may be harmful to persons handling the dry solid composition. Although the active may be incorporated in dry solid particles as known to the art, which may inhibit the formation of active dust it is a fact that active dust is still being released from known particles, e.g. as measured by the known Heubach Method, and there is a need for further improvement.

Conventional particles are usually solid and brittle which makes them susceptible to damage when a strain is applied to them. However, by applying the coating of the invention around the particle a mechanical elastic "buffer" material is placed between the core particle comprising the active and the environment causing strain on the particle.

Definitions

The term "true density" of a compound as used herein, is to be construed as the density in weight per volume of said compound, determined by immersing a weighed amount of the compound in a liquid in which the compound is insoluble and measuring the volume increase of liquid dispersion (i.e. the volume of liquid which is displaced by the compound). As an example, if 1 gram of a compound is added to a volume of 10 cm$^3$ of a liquid in which the compound is insoluble and by said addition the volume of the liquid-compound mixture increases to 11 cm$^3$, the compound thereby displacing 1 cm$^3$ of liquid, the true density of the compound is 1 gram per cm$^3$. The true density of a liquid may be measured as the weight of a measured volume of the liquid.

The term "wax" as used herein, is to be construed as a compound having a melting point between 25–150° C.

The phrase "ratio between the diameter of the coated particle and the diameter of the core particle" (hereinafter abbreviated $D_T/D_C$) as used herein is to be understood as the diameter of a particle comprising a core particle and a coating divided by the diameter of the core particle only. If for example a core particle having a diameter of 100 μm is coated with a coating layer 200 μm thick, the coated particle would have a diameter of (200+100+200)=500 μm and $D_T/D_C$ is 500 μm/100 μm=5.

The term "substantially enzyme free" as used herein about a coating means that there less than 5 mg of enzyme per gram coating. In practice no active is added to the coating feed.

The Coating

The coating of the invention comprises a gas phase component. We have found that by incorporating a gas phase component, the density of the coating is lowered and at the same time by having a compressible gas phase in the coating the elasticity is improved. In particular, the coating matrix incorporating the gas phase component is a solid phase material.

The gas phase component is to be understood as any gas or mixture of gases, such as atmospheric air, carbon dioxide, nitrogen, noble gases. In particular the gas phase component is carbon dioxide.

The gas phase component should constitute at least 20% by volume (v/v) of the coating material, particularly at least 40% by volume, more particularly at least 60% by volume and most particularly at least 80% by volume. This will typically require a solubility of at least 0.01, particularly 0.03, more particularly 0.06, even more particularly 0.16 moles of gas per liter of coating material (excl. solvent) at the temperature and pressure given.

The gas comprised in the coating may be present in the form of gas bubbles entrapped in a matrix of other coating materials. It may also be entrapped in light spheres.

Light Spheres

Light spheres are small particles with low true density. Typically, they are hollow spherical particles with air or gas inside. Such materials are usually prepared by expanding a solid material. These light spheres may be inorganic of nature such as SCOTCHLITE™ Glass Bubbles from 3M™ (hollow glass spheres), Q-CEL® (hollow microspheres of borosilicate glass) and/or Extendospheres® (ceramic hollow spheres) available from The PQ Corporation. The light spheres may also be of organic nature such as the PM-series (plastic hollow spheres) available from The PQ Corporation. Expancel® (hollow plastic spheres) from AKZO Nobel, Luxsil® and Sphericel from Potters Industries and/or Styrocell$^{R)}$ from SHELL, which is spheres of polystyrene. The polystyrene of Styrocell$^{R)}$ contains pentane which upon heating boils and expands or pops the material (the reaction is comparable to the expansion of corn seeds into popcorn) leaving a light polystyrene material of a low true density. Also polysaccharides are preferred, such as starch or derivatives thereof. Biodac® is an example of non-hollow lightweight material made from cellulose (waste from papermaking), available from GranTek Inc. These materials may be included in the granules of the invention either alone or as a mixture of different light materials.

Other Coating Materials

The coating also contains a matrix of materials suitable for entrapping the gas phase component. Such materials include but are not limited to waxes, polypeptides, and carbohydrate polymers, which may form an elastic network entrapping the gas.

The wax included in this list encompass polymeric compounds, which have a melting point between 20–150° C. Preferred waxes are organic compounds or salts of organic compounds having a melting point in the said range. In the context of the invention the term "wax" as used herein also encompasses mixtures of two or more different waxes. Also, an important feature of the wax or mixture of waxes is that the wax should be water soluble or water dispersible, particularly in neutral and alkaline solution, so that when the coated particles of the invention is introduced into an aqueous solution, i.e. by diluting it with water, the wax should disintegrate and/or dissolve providing a quick release and dissolution of the active incorporated in the particles to the aqueous solution. Examples of water soluble waxes are polyethylene glycols (PEG's). Accordingly amongst water soluble waxes the solubility of wax in water should in particular be up to 75 parts wax to 25 parts water, such as for PEG 1000. Amongst water insoluble waxes, which are dispersible in an aqueous solution are triglycerides and oils.

The wax should be in a solid state at room temperature (25° C.), and accordingly have a melting point or a melting range (polymer waxes tend to melt over a range of temperatures) above this temperature. A particular wax has a melting point or range between about 35° C. to about 120° C. The lower limit is preferred to set a reasonable distance between the temperature at which the wax melts to the temperature at which liquid compositions comprising the particles are usually stored (20–30° C.). Also, difficulties are contemplated, in the manufacture of the particles when the melting point of the wax is below 35° C. Another melting point or range is between about 40° C. to about 100° C., such as between about 50° C. to about 80° C. In a further embodiment the wax should have a molecular weight between about 150 Daltons to about 10,000 Daltons.

The wax of the invention may be any wax, which is chemically synthesized. It may also equally well be a wax isolated from a natural source or a derivative thereof. Accordingly, the wax of the invention is may be selected from the following non limiting list of waxes.

Polyethylene glycols, abbreviated PEG, type of wax. Different PEG waxes are commercially available having different molecular sizes, wherein PEG's with low molecular sizes also have low melting points. Examples of suitable PEG's are PEG 1500, PEG 3000, PEG 4000, PEG 6000, PEG 9000 e.g. from BASF-Germany. To meet the desired properties of true density and melting point for the wax and/or the enzyme particle, it also contemplated that mixtures of waxes with low melting point with waxes of a high melting point is a very useful embodiment of the invention.

Polypropylenes or polyethylenes or mixtures thereof.

Nonionic tensides which are solid at room temperature such as ethoxylated fatty alcohols having a high level of ethoxy groups such as Lutensol AT80 from BASF having 80 units of ehtyleneoxide per molecule. Alternatively polymers of ethyleneoxide, propyleneoxide or copolymers thereof are useful, such as in block polymers, e.g. Pluronic PE 6800 from BASF Germany.

Waxes isolated from a natural source, such as Carnauba wax (melting point between 80–88° C.), Candelilla wax (melting point between 68–70° C.) and bees wax. Other natural waxes or derivatives thereof are waxes derived from animals or plants, e.g. of marine origin. Examples of such waxes are hydrogenated ox tallow, hydrogenated palm oil, hydrogenated cotton seeds and/or hydrogenated soy bean oil, wherein the term "hydrogenated" as used herein is to be construed as saturation of unsaturated carbohydrate chains, e.g. in triglycerides, wherein carbon=carbon double bonds are converted to carbon-carbon single bonds. Hydrogenated palm oil is commercially available e.g. from Hobum Oele und Fette GmbH-Germany or Deutche Cargill GmbH-Germany.

Fatty acid alcohols, such as the linear long chain fatty acid alcohol NAFOL 1822 ($C_{18, 20, 22}$) from Condea Chemie GMBH-Germany, having a melting point between 55–60° C. and having a true density of about 0.96 $g/cm^3$.

Monoglycerides and/or diglycerides, such as glyceryl stearate, wherein stearate is a mixture of stearic and palmitic acid, are useful waxes. An example of this is Dimodan PM—from Danisco Ingredients, Denmark—having a true density of about 1 $g/cm^3$.

Fatty acids, such as hydrogenated linear long chained fatty acids.

Paraffines, i.e. solid hydrocarbons.

Micro-crystalline wax.

In further embodiments waxes which are useful in the invention can be found in C. M. McTaggart et. al., Int. J. Pharm. 19, 139 (1984) or Flanders et.al., Drug Dev. Ind. Pharm. 13, 1001 (1987) both incorporated herein by reference.

Polypeptides may be selected from gelatine, collagen, casein, chitosan, polyaspartic acid and polyglutamic acid.

Carbohydrate polymers may be selected from pectin, starch, modified starch, cellulose, modified cellulose, carrageenan, gum Arabic, acacia gum, xanthan gum, locust bean gum and guar gum. As employed in the context of the present invention, the term "modified starch" denotes a starch (native starch), which has undergone some kind of at least partial chemical modification, enzymatic modification, and/or physical or physicochemical modification, and which—in general—exhibits altered properties relative to the "parent" starch.

Relevant chemical modifications include, but are not limited to: esterification of hydroxy groups (achieved, e.g. via acetylation); etherification of hydroxy groups; oxidation (achieved, e.g. via reaction with chlorine or hypochlorite); and cross-linking (achieved, e.g. by reaction with formaldehyde or epichlorohydrin).

Relevant enzymatic modifications include, for example, treatment with a starch-degrading or starch-modifying enzyme, e.g. an amylase, such as an α-amylase or glucoamylase.

Relevant physical or physicochemical modifications include, in particular, so-called gelatinisation. The term "gelatinised", in the context of starch, is used herein in accordance with usage in the art (see, e.g. A. Xu and P. A. Seib, Cereal Chem. 70 (1993), pp. 463–470). Synthetic polymers may be selected from polyvinyl pyrrolidone (PVP), polyvinyl alcohol (PVA), polyvinyl acetate, polyacrylate, polymethacrylate, polyacrylamide, polysulfonate, polycarboxylate, and copolymers thereof, in particular water soluble polymers or copolymers.

The coating may also contain one or more conventional coating materials, in particular materials, which are soluble or dispersible in water. Conventional coating materials are described e.g. in WO 89/08694, WO 89/08695, EP 270608 B1 and/or WO 00/01793. Other examples of conventional coating materials may be found in U.S. Pat. No. 4,106,991, EP 170360, EP 304332, EP 304331, EP 458849, EP 458845, WO 97/39116, WO 92/12645A, WO 89/08695, WO 89/08694, WO 87/07292, WO 91/06638, WO 92/13030, WO 93/07260, WO 93/07263, WO 96/38527, WO 96/16151, WO 97/23606, U.S. Pat. Nos. 5,324,649, 4,689, 297, EP 206417, EP 193829, DE 4344215, DE 4322229 A, DD 263790, JP 61162185 A and/or JP 58179492.

The coating may comprise materials selected from binders, fibers, salts, water insoluble minerals, pigments, enzyme stabilizers, waxes or combinations thereof.

Particulate materials in the coating may act as nucleating agents for improving the gas formation tendency.

In a particular embodiment the coating may comprise:

Enzyme stabilising agents. Enzyme stabilising or protective agents such as conventionally used in the field of granulation may be elements of the coating. Stabilising or protective agents may fall into several categories: alkaline or neutral materials, reducing agents, antioxidants and/or salts of first transition series metal ions. Each of these may be used in conjunction with other protective agents of the same or different categories. Examples of alkaline protective agents are alkali metal silicates, carbonates or bicarbonates, which provide a chemical scavenging effect by actively neutralising e.g. oxidants. Examples of reducing protective agents are salts of sulfite, thiosulfite, thiosulfate or $MnSO_4$ while examples of antioxidants are methionine, butylated hydroxytoluene (BHT) or butylated hydroxyanisol (BHA). In particular stabilising agents may be salts of thiosulfates, e.g. sodium thiosulfate or methionine. Also enzyme stabilizers may be borates, borax, formates, di- and tricarboxylic acids and reversible enzyme inhibitors such as organic compounds with sulfhydryl groups or alkylated or arylated boric acids. Examples of boron based stabilizer may be found in WO 96/21716, whereas a preferred boron based stabilizer is 4-Formyl-Phenyl-Boronic Acid or derivatives thereof described in WO 96/41859 both disclosures incorporated herein by reference. Still other examples of useful enzyme stabilizers are gelatine, casein, Polyvinyl pyrrolidone (PVP) and powder of skimmed milk. The amounts of protective agent in the coating may be 5–40% w/w of the coating, particularly 5–30%, e.g. 10–20%.

Solubilizing agents. The solubility of the coating is especially critical in cases where the coated particle is a component of detergent formulation. As is known by the person skilled in the art, many agents, through a variety of methods, serve to increase the solubility of formulations, and typical agents known to the art can be found in national Pharmacopeia's. Thus, the core particle may optionally comprise any agent that serves to enhance the solubility of the coated particle.

Inorganics, such as water soluble and/or insoluble inorganic salts such as finely ground alkali sulphate, alkali carbonate and/or alkali chloride, clays such as kaolin (e.g. SPESWHITE™, English China Clay), bentonites, talcs, zeolites, calcium carbonate, and/or silicates.

Binders, e.g. binders with a high melting point or indeterminately high melting points and of a non-waxy nature, e.g. polyvinyl pyrrolidone, dextrins, polyvinylalcohol, cellulose derivatives, for example hydroxypropyl cellulose, methyl cellulose or CMC. A suitable binder is a carbohydrate binder such as Glucidex 21D™ available from Roquette Freres, France.

Fiber materials such as pure or impure cellulose in fibrous form. This can be sawdust, pure fibrous cellulose, cotton, or other forms of pure or impure fibrous cellulose. Also, filter aids based on fibrous cellulose can be used. Several brands of cellulose in fibrous form are on the market, e.g. CEPO™ and ARBOCELL™. Pertinent examples of fibrous cellulose filter aids are is Arbocel BFC200™ and Arbocel BC200™. Also synthetic fibers may be used as described in EP 304331 B1 and typical fibers may be made of polyethylene, polypropylene, polyester, especially nylon, polyvinyl-formate, poly (meth)acrylic compounds.

Cross-linking agents such as enzyme-compatible surfactants, e.g. ethoxylated alcohols, especially ones with 10 to 80 ethoxy groups. These may both be found in the coating and in the core particle.

Suspension agents, mediators (for boosting bleach action upon dissolution of the particle in e.g. a washing application) and/or solvents may be incorporated in the coating.

Viscosity regulating agents. Viscosity regulating agents may be present in the coating.

The coating should encapsulate the core particle by forming a continuous homogenous layer.

The coating may perform any of a number of functions in the particle or granule, depending on the intended use. Thus, for example, a coating may achieve one or more of the following effects:

(i) further reduction of the dust-formation tendency of a core particle;

(ii) further protection of active(s) in the core particle against oxidation by bleaching substances/systems (e.g. perborates, percarbonates, organic peracids and the like);

(iii) dissolution at a desired rate upon introduction of the particle into a liquid medium (such as an aqueous medium);

(iv) provide a better physical strength of the particle of the invention.

The coating may further comprise one or more of the following: Chlorine scavengers, plasticizers, pigments, lubricants (such as surfactants or antistatic agents) and fragrances.

Plasticizers useful in coating layers in the context of the present invention include, for example: polyols such as sugars, sugar alcohols, glycerine, glycerol trimethylol propane, neopentyl glycol, triethanolamine, mono-, di- and triethylene glycol or polyethylene glycols (PEGs) having a molecular weight less than 1000; urea, phthalate esters such as dibutyl or dimethyl phthalate; thiocyanates, non-ionic surfactants such as ethoxylated alcohols and ethoxylated phosphates and water.

Suitable pigments include, but are not limited to, finely divided whiteners, such as titanium dioxide or kaolin, colored pigments, water soluble colorants, as well as combinations of one or more pigments and water soluble colorants.

As used in the present context, the term "lubricant" refers to any agent, which reduces surface friction, lubricates the surface of the granule, decreases tendency to build-up of static electricity, and/or reduces friability of the granules. Lubricants can also play a related role in improving the coating process, by reducing the tackiness of binders in the coating. Thus, lubricants can serve as anti-agglomeration agents and wetting agents.

Examples of suitable lubricants are lower polyethylene glycols (PEGs), ethoxylated fatty alcohols and mineral oils. The lubricant is particularly a mineral oil or a nonionic surfactant, and more particularly the lubricant is not miscible with the other coating materials.

In a particular embodiment of the invention the core particle of the invention is coated with a protective coating having a high constant humidity such as described in the Danish patent application WO 00/01793 pages 5–9 and given examples, which is hereby incorporated by reference.

In a still further embodiment the coating is thicker than known coatings in that $D_T/D_C$ is at least 1.1, particularly at least 1.5, more particularly at least 2, more particularly at least 2.5, more particularly at least 3, most particularly at least 4. $D_T/D_C$ is however particularly below about 100, particularly below about 50, more particularly below 25, and most particularly below 10. A particularly range for $D_G/D_C$ is about 4 to about 6.

The thickness of the coating may be at least 25 µm. A particular thickness is at least 50 µm such as at least 75 µm, at least 100 µm, least 150 µm, least 200 µm, least 250 µm or particularly at least 300 µm.

The coating, in certain embodiments, can comprise several coating layers, each with a special function.

In a one embodiment the coating has an outer layer of a liquid lubricant. The purpose of the lubricant is to grease the granule so as to increase flow ability of the granule and to further inhibit dust formation when individual granules collide during handling.

The coating material including the gas phase component should has a true density below 0.8 g/cm$^3$, particularly below 0.6 g/cm$^3$, more particularly below 0.4 g/cm$^3$ and most particularly below 0.2 g/cm$^3$.

The Core Particle

The core particle contains the active. Besides of the active the core particle may be constructed in any way or of any material, which provides the desired functional properties of the core material, e.g. the core may consist of materials, which allows readily release of the active (s) upon introduction to an aqueous medium. In one embodiment the core particle is constructed of a particulate carrier (I) with the active absorbed and/or an enzyme containing layer (II) applied on the carrier surface, optionally comprising a protecting reducing agent. There may even be additional coating within the core material providing desired functional properties of the core material. Another core particle may be the so called T-granulate wherein active and granulation material is mixed to form granules incorporating the enzyme distributed throughout the core such as described in U.S. Pat. No. 4,106,991 e.g. Example 1. Any conventional methods and non-active materials may be used to prepare the core particle. Examples of known conventional cores particles and materials is, inter alia, described in, U.S. Pat. No. 4,106,991 (in particular), EP 170360, EP 304332, EP 304331, EP 458849, EP 458845, WO 97/39116, WO 92/12645, WO 89/08695, WO 89/08694, WO 87/07292, WO 91/06638, WO 92/13030, WO 93/07260, WO 93/07263, WO 96/38527, WO 96/16151, WO 97/23606, U.S. Pat. Nos. 5,324,649, 4,689,297, EP 206417, EP 193829, DE 4344215, DE 4322229 A, DD 263790, JP 61162185 A, JP 58179492.

As a particularly embodiment of the invention the core particle may be prepared by applying a layer of active onto a "placebo" carrier (active-free carrier) according to the methodology described in U.S. Pat. No. 4,106,991. Optionally additional active may be absorbed into the surface of the carrier.

In a particular embodiment of the invention the core particle may also comprise a protective agent as described for the coating, vide supra, particularly mixed with the active in suitable amounts such as 0.1–1% w/w of the coated particle, particularly 0.1–0.5% w/w, e.g. 0.33% w/w. The protective agent may be an antioxidant, a reducing agent or a mixture.

In one embodiment the core particle comprises an active dispersed in a visco-elastic liquid matrix having a $\eta'$ and a $f'''$ both between $10^3$ to $10^{14}$ Pa measured in a cone-and-plate rheometer at 25° C. and a sinusoidal frequencies ω of 1 Hz.

The visco-elastic liquid making up the matrix wherein the active and optionally other useful components may in principle be any material or mixtures of materials which meets the requirements for viscosity and elasticity set for the visco-elastic core particles.

In particular materials may be organic visco-elastic materials such as liquid materials comprising, consisting of or containing organic polymers and/or monomers. Materials such as carbohydrate polymers (e.g. pectins), proteins (e.g.) gelatin, sugars, glucose syrups, modified vegetable oils or mixtures thereof can be brought or formulated into a liquid state having visco-elastic properties as described above.

Particularly a majority of the components constituting the visco-elastic liquid matrix are water soluble.

In one embodiment the visco-elastic liquid matrix has a $\eta'$ and a $\eta''$ between $10^8$ to $10^{12}$ Pa, in particular between $10^9$ to $10^{11}$ Pa when measured in a cone-and-plate rheometer at 25° C. and a sinusoidal frequency ω of 1 Hz. In another embodiment the visco-elastic liquid matrix has a $\eta'$ and a $\eta''$ between $10^4$ to $10^{11}$ Pa when measured in a cone-and-plate rheometer at 25° C. and a sinusoidal frequency ω of 1 Hz.

In context of the present invention the term "liquid" is to be understood as a property of a material. A liquid material is defined as a material for which a certain amount of stress, i.e. force pr. unit area is obtained, when a deformation force, i.e. a strain, is applied to the liquid material as long as deformation occurs. As soon as deformation stops the stress level decreases immediately to the steady state level, which always will be exactly zero. Liquids are incapable of sustaining or maintaining an internal permanent stress in the liquid.

A liquid (fluid) is visco-elastic, when the time span for the stress in the material to reach exactly zero after a deformation is sufficiently large. Visco-elastic liquids may be described using a simple model containing two parameters $\eta'$ (ω) and $\eta''$ (ω), which may easily be measured in a cone-and-plate rheometer (eg. Bohlin Rheometer) for different sinusoidal frequencies ω. $\eta'$ (ω) may be interpreted as the elasticity of the visco-elastic fluids and $\eta''$ (ω) as the viscosity. The tangent of ratio $\delta = \eta'$ (ω)/$\eta''$ (ω), measured in degrees is called the loss tangent=tan δ. This definition is acknowledged in the art e.g. in Bird R. B., Armstrong R. C., Hassager O. "Dynamics of polymeric liquids", Volume 1: Fluid mechanics, John Wiley and Sons, Chapter 6, especially example 6.1.2.1 pp 281, 1977. Visco-elastic liquids of the invention has a $\eta'$ and a $\eta''$ between $10^3$ to $10^{14}$ Pa when measured in a cone-and-plate rheometer (eg. Bohlin Rheometer) using a sinusoidal frequencies ω of 1 Hz at 25°.

The visco-elastic liquids used in present invention may be materials containing no or at least very little water. Water may be bound to the components of the liquid or it may contain water absorbed from a humid environment. The amount of water in the liquid will therefore depend on the components of the liquid, the hygroscopicity of the components and the humidity of the surrounding environment. The visco-elastic liquids used in the present invention may contain below 30% w/w water, particularly below 20% w/w water, particularly 10% w/w water, particularly below 5% w/w water, more particularly below 3% w/w, more particularly below 1% w/w or no detectable amount of water.

The core particle should in particular be less than 700 µm or 600 µm, particularly between 50 and 500 µm, such as between 100 and 400 µm, most particularly between 200 and 300 µm.

In general the core particles may have a true density below 3 g/cm$^3$, preferably below 2 g/cm$^3$, more particularly below 1.5 g/cm$^3$.

Actives

The active of the invention may be any active component or mixture of active components, which benefits from being separated from the environment surrounding the particle.

The term "active" is meant to encompass all components, which upon release from the particle upon applying the particle of the invention in a process serves a purpose of improving the process. Suitable actives are those, which are either subject of deactivation and/or causing deactivation to other components in the compositions of the invention. As said the active may be present dispersed as discrete solid particles in the core particle.

The active may be inorganic of nature such as bleach components as mentioned infra or organic. In particular actives may be active biological materials, which are usually very sensitive to the surrounding environment and benefits from being embedded in a particle, such as materials obtainable from microorganisms. In particular actives may be peptides or polypeptides such as enzymes.

The enzyme in the context of the present invention may be any enzyme or combination of different enzymes. Accordingly, when reference is made to "an enzyme" this will in general be understood to include combinations of one or more enzymes.

It is to be understood that enzyme variants (produced, for example, by recombinant techniques) are included within the meaning of the term "enzyme". Examples of such enzyme variants are disclosed, e.g., in EP 251,446 (Genencor), WO 91/00345 (Novo Nordisk), EP 525,610 (Solvay) and WO 94/02618 (Gist-Brocades NV).

The enzyme classification employed in the present specification with claims is in accordance with *Recommendations (1992) of the Nomenclature Committee of the International Union of Biochemistry and Molecular Biology*, Academic Press, Inc., 1992.

Accordingly the types of enzymes which may appropriately be incorporated in granules of the invention include oxidoreductases (EC 1.-.-.-), transferases (EC 2.-.-.-), hydrolases (EC 3.-.-.-), lyases (EC 4.-.-.-), isomerases (EC 5.-.-.-) and ligases (EC 6.-.-.-).

Particular oxidoreductases in the context of the invention are peroxidases (EC 1.11.1), laccases (EC 1.10.3.2) and glucose oxidases (EC 1.1.3.4)]. An Example of a commercially available oxidoreductase (EC 1.-.-.-) is Gluzyme™ (enzyme available from Novo Nordisk A/S). Further oxidoreductases are available from other suppliers. Particular transferases are transferases in any of the following subclasses:
  a) transferases transferring one-carbon groups (EC 2.1);
  b) transferases transferring aldehyde or ketone residues (EC 2.2); acyltransferases (EC 2.3);
  c) glycosyltransferases (EC 2.4);
  d) transferases transferring alkyl or aryl groups, other that methyl groups (EC 2.5); and
  e) transferases transferring nitrogeneous groups (EC 2.6).

One example of transferases, which may be used in the present invention is a transglutaminase (protein-glutamine γ-glutamyltransferase; EC 2.3.2.13).

Further examples of suitable transglutaminases are described in WO 96/06931 (Novo Nordisk A/S).

Particular hydrolases in the context of the invention are: Carboxylic ester hydrolases (EC 3.1.1.-) such as lipases (EC 3.1.1.3); phytases (EC 3.1.3.-), e.g. 3-phytases (EC 3.1.3.8) and 6-phytases (EC 3.1.3.26); glycosidases (EC 3.2, which fall within a group denoted herein as "carbohydrases"), such as α-amylases (EC 3.2.1.1); peptidases (EC 3.4, also known as proteases); and other carbonyl hydrolases].

In the present context, the term "carbohydrase" is used to denote not only enzymes capable of breaking down carbohydrate chains (e.g. starches or cellulose) of especially five- and six-membered ring structures (i.e. glycosidases, EC 3.2), but also enzymes capable of isomerizing carbohydrates, e.g. six-membered ring structures such as D-glucose to five-membered ring structures such as D-fructose.

Carbohydrases of relevance include the following (EC numbers in parentheses): α-amylases (EC 3.2.1.1), β-amylases (EC 3.2.1.2), glucan 1,4-α-glucosidases (EC 3.2.1.3), endo-1,4-beta-glucanase (cellulases, EC 3.2.1.4), endo-1,3 (4)-β-glucanases (EC 3.2.1.6), endo-1,4-β-xylanases (EC 3.2.1.8), dextranases (EC 3.2.1.11), chitinases (EC 3.2.1.14), polygalacturonases (EC 3.2.1.15), lysozymes (EC 3.2.1.17), β-glucosidases (EC 3.2.1.21), α-galactosidases (EC 3.2.1.22), β-galactosidases (EC 3.2.1.23), amylo-1,6-glucosidases (EC 3.2.1.33), xylan 1,4-β-xylosidases (EC 3.2.1.37), glucan endo-1,3-β-D-glucosidases (EC 3.2.1.39), α-dextrin endo-1,6-α-glucosidases (EC3.2.1.41), sucrose α-glucosidases (EC 3.2.1.48), glucan endo-1,3-α-glucosidases (EC 3.2.1.59), glucan 1,4-β-glucosidases (EC 3.2.1.74), glucan endo-1,6-β-glucosidases (EC 3.2.1.75), arabinan endo-1,5-α-L-arabinosidases (EC 3.2.1.99), lactases (EC 3.2.1.108), chitosanases (EC 3.2.1.132) and xylose isomerases (EC 5.3.1.5).

Examples of commercially available proteases (peptidases) include KANNASE™, EVERLASE™, ESPERASE™, ALCALASE™, NEUTRASE™, DURAZYM™, SAVINASE™, PYRASE™, PANCREATIC TRYPSIN NOVO (PTN), BIO-FEED™ PRO and CLEAR-LENS™ PRO (all available from Novo Nordisk A/S, Bagsvaerd, Denmark).

Other commercially available proteases include MAXATASE™, MAXACAL™, MAXAPEM™, OPTICLEAN™ and PURAFECT™ (available from Genencor International Inc. or Gist-Brocades).

Examples of commercially available lipases include LIPOPRIME™, LIPOLASE™, LIPOLASE™ ULTRA, LIPOZYME™, PALATASE™, NOVOZYM™ 435 and LECITASE™ (all available from Novo Nordisk A/S).

Other commercially available lipases include LUMAFAST™ (*Pseudomonas mendocina* lipase from Genencor International Inc.); LIPOMAX™ (Ps. pseudoalcaligenes lipase from Gist-Brocades/Genencor Int. Inc.; and Bacillus sp. lipase from Solvay enzymes. Further lipases are available from other suppliers.

Examples of commercially available carbohydrases include ALPHA-GAL™, BIO-FEED™ ALPHA, BIO-FEED™ BETA, BIO-FEED™ PLUS, BIO-FEED™ PLUS, NOVOZYME™ 188, CELLUCLAST™, CELLUSOFT™, CEREMYL™, CITROZYM™, DENIMAX™, DEZYME™, DEXTROZYME™, FINIZYM™, FUNGAMYL™, GAMANASE™, GLUCANEX™, LACTOZYM™, MALTOGENASE™, PENTOPAN™, PECTINEX™, PROMOZYME™, PULPZYME™, NOVAMYL™, TERMAMYL™, AMG™ (AMYLOGLUCOSIDASE NOVO), MALTOGENASE™, SWEETZYME™ and AQUAZYM™ (all available from Novo Nordisk A/S). Further carbohydrases are available from other suppliers.

The amount of active, such as enzyme (calculated as pure enzyme protein) in a core particle of the invention will typically be in the range of from about 20% to 65% by weight of the core particle, particularly no less than 25%, such as no less than 30%, 35%, 40%, 45%, 50%, 55%, 60% or 65% by weight.

Method of Preparing Coated Particles

Preparing Core Particles
  Methods for preparing core particles include those disclosed in the above mentioned references, i.e. a) spray dried products, b) layered products, c) absorbed products, d) extrusion or pelletized products, e) prilled products and f) mixer granulation products.

Methods for preparing a visco-elastic liquid core particle include those described in PA 2000 01459.

Methods for preparing a visco-elastic liquid core particles should always contain the step of dispersing the active and optionally other materials, preferably in a dry solid particulate form, in a visco-elastic liquid matrix to a referably homogenous dispersion. This step could suitably be conducted at elevated temperatures to gain a lower viscosity than that of the finished particles. However, due care should be taken in not damaging the active by the heat. In this context an important feature is that the visco-elastic liquid matrix has a low amount of water, because the absence of water may make it possible to apply higher temperatures than if water was present without significantly damaging the active.

After preparing this mixture a number of different step can be applied to prepare liquid particles from the dispersion.

In one embodiment the dispersion is cooled to freeze and the dispersion is crushed and/or grinded to obtain small particles of the frozen liquid.

In another embodiment the dispersion is processed while the visco-elastic liquid matrix is in its liquid state by rolling the dispersion into a thin sheet of visco-elastic liquid material and cutting out pieces. This method resembles the way Italian pasta is made by preparing sheets of material and slicing pieces of a desired shape from the sheet.

In a third embodiment the dispersion is extruded through a small hole and cut into small pieces The particles obtained in the above mentioned is preferably rounded to achieve spherical or near spherical shape of the particles. This can be done conventionally, such as in a Marumarizer. It is however preferred to use liquid nature of the particles to shape to particles. By fluidising the particles in a fluid bed dryer and subjecting the particles to heat the surface tension of the visco-elastic liquid matrix will cause the particles to adapt a spherical shape. This procedure also facilitates any subsequent coating step because application of the coating may be conducted after rounding of the particles, but while the particles are still fluidised. In a fluid bed coating process the fluidised core particles are sprayed with a solution containing the coating material(s), and the coating is deposited on the surface of the core particles by evaporating the solution solvent.

Applying the Coating

One advantage of the use of a gas-containing coating is the flexibility of the coating obtained, such a coating being impact absorbing, thus causing less mechanical strain on the individual particles and further limiting the problem of dust formation.

Applying a coating comprising a gas phase component to a core particle may be obtained in several ways. One way is to mix a gas into a coating material, e.g. by intensive mixing or by bubbling the gas through the liquid coating material at a temperature in which the coating material is in a liquid form and then spraying the liquid coating material onto the core particles under cooling conditions so that the coating material deposits and solidifies on the core particles thereby entrapping the gas phase component in the coating. This method also applies when incorporating light spheres into the coating material.

Another way to provide a coating comprising a gas phase component is to prepare a coating material comprising a gas generating component, applying this coating to the core particle and treating the coated particle so as to generate a gas from the gas generating component. In one embodiment the treatment is physical such as heating. In a further embodiment a relatively volatile component, such as lower alkyls e.g. isopentan is mixed into the coating and by subjecting the coated particle to heat, e.g. such as in a pasteurisation process heating only the coating, the volatile component will boil and create gas filled bubbles in the coating, which will be fixed or entrapped when the coating solidifies at ambient temperature. This type of coating may also be made with carbohydrate polymers, by boiling the water contained in the polymer (pop corn popping reaction).

Another type of treatment is chemical treatment. In one embodiment a compound, which undergoes a chemical reaction, in which at least one product is a gas, by the treatment is mixed into the coating and by subjecting the coated particle to the chemical treatment the gas is formed. In a specific embodiment the compound may be a bicarbonate salt, which is mixed into the coating material, the coating is applied to the core particle and the coated particles are treated by an acid whereby carbon dioxide gas is formed, entrapped in the solid coating.

The coating may be applied to the core particles using any conventional coating method such as in a mixer or in a fluid bed. In a particular embodiment of the fluid bed coating process, the fluidised core particles are sprayed with a solution containing the coating material(s) and the coating is deposited on the surface of the core particles by evaporating the solution solvent, see e.g. U.S. Pat. No. 6,136,772.

If the coating is applied to the core particles in a fluid bed the temperature of the coating will typically be between 0 to 100° C., particularly between 10 to 90° C., more particularly between 10 to 80° C. or most particularly between 10 to 70° C. The inlet air-temperature in the fluid bed will typically be between 40 to 200° C., particularly between 40 to 100° C., more particularly between 40 to 80° C.

If the coating comprises a wax and it is applied in a mixer the mixer temperature should be higher than the melting temperature of the wax. This will typically lie between 30 to 100° C.

Foam-like or porous particles may also be obtained by mixing a feed with a gas under pressure and spray drying thereof such as in the production of a spray-dried coffee product, see e.g. U.S. Pat. No. 3,749,378.

For example the coated particle may be prepared by a method comprising the following steps:

(i) providing a coating feed comprising a coating material, a gas phase component and optionally a solvent, at a pressure above atmospheric pressure, (ii) applying the gas-containing coating feed to a core particle in a coating chamber, (iii) releasing the pressure wholly or partly to atmospheric pressure, wherein said pressure release can be performed before or after step (ii).

One advantage of this method is that results in a coated particle having a high active content on a weight basis without the need for additional treatment in the form of e.g. heating or chemical treatment after the coating step in order to get a porous protective coating.

When the coating feed enters the coating chamber a nozzle is used which will atomise the coating feed. Principally, at least two types of nozzles can be used according to the invention. The nozzle can be a two-fluid nozzle (TFN) with internal or external mixing wherein the gas phase component and coating material are mixed inside or outside the nozzle, respectively. A representative example of a two-fluid nozzle is disclosed in U.S. Pat. No. 6,161,778.

Alternatively the nozzle may be a pressure two-fluid nozzle (PTFN). An example of a pressure two-fluid nozzle is disclosed in U.S. Pat. No. 5,272,820.

Alternatively, the components of the coating feed may be mixed and pre-expanded before entering the nozzle.

The pressure applied may vary within a broad range depending on the nature of the cores to be coated, the gas phase component and its solubility in the coating material, the viscosity of the liquid and the desired droplet size. Thus in principle any pressure from about $2 \times 10^5$ Pa to about $5 \times 10^7$ Pa may be applied on the gas phase component, preferably a pressure in the range $1 \times 10^6$ Pa to about $2 \times 10^7$ Pa.

The extent of the pressure release depends on the extent of gas formation desired, and the nature of the cores to be coated. It may be beneficial to release the pressure only partly to atmospheric pressure in the coating chamber, and to release the remaining pressure after the coated particles have left said chamber, or release the pressure in the chamber prior to discharge. This could be an advantage in case of a very high back pressure, that if released in one step could result in a less efficient coating.

The pressure release causing the expansion of the gas phase component entrapped in the coating material may in one embodiment of the process according to the invention take place in a single step. Said pressure release may take place before the coating feed leaves the nozzle. However, in a preferred embodiment of the invention, the pressure release takes place when the coating feed leaves the nozzle and enters the coating chamber.

In another embodiment of the process according to the invention the pressure release is performed in at least one primary and one secondary step. Thus in order to prevent an excessive sudden foaming it may be advantageous to perform the expansion of the coating feed in several steps.

Via a gradual pressure release it is possible to control the foam formation and thereby to obtain a more stable and less sensitive foam. A gradual pressure release is particularly beneficial when a gas phase is employed which must be applied under high pressure in order to solubilize a sufficient amount thereof, such as $CO_2$ in PVA at a pressure of about $7-8 \times 10^6$ Pa. In such a case a primary pressure release to e.g. about $2-3 \times 10^5$ Pa may be suitable.

TFN's with internal mixing have the advantage in the process according to the invention that the necessary back-pressure is formed in the coating feed in order to dissolve the gas prior to the atomisation. The internal mixing type nozzle mixes the atomisation gas and the liquid just before leaving the nozzle head. The rapid pressure drop causes the dissolved gas to form small bubbles in the droplets, which in turn results in formation of a foam.

Accordingly in one embodiment of the process according to the invention the coating feed enters the coating chamber by means of a two-fluid nozzle (TFN).

PTFN is a combination of a pressure nozzle and a two-fluid nozzle. The atomisation of the coating feed is accomplished as a result of the combined energy supplied by the hydraulic pressure and the supplied compressed gas. The PTFN has the same advantage as the internal mixing TFN regarding the back-pressure on the coating feed. Additionally it has the flexibility that the back-pressure can be independently controlled, whereas the internal mixing TFN always has the same back-pressure as the supplied pressure of the atomisation gas.

Thus, in another embodiment of the invention the coating feed enters the coating chamber by means of a pressure two-fluid nozzle (PTFN).

In another embodiment of the invention the coating feed is heated in order to further enhance the gas formation tendency. Said heating may be performed at various temperatures, preferably no more than 200° C.

After leaving the nozzle the coating feed enters the coating chamber. The coating chamber may be any of a number of coating chambers known per se. Thus said chamber could be in the form of a coating device, wherein the coating feed as well as the core particles to be coated enter the coating chamber in the upper part thereof. The core particles become coated and dried on their way down the coating chamber and leave said chamber in the lower part thereof. A representative example of said embodiment is shown in U.S. Pat. No. 5,993,549.

Alternatively, the coating chamber may be a fluid-bed apparatus, wherein the coating feed incorporating the gas phase component as disclosed above enters the chamber at the bottom thereof. The fluid-bed chamber comprises a housing for containing the core particles to be coated and a base plate positioned and arranged at the bottom of said housing. A particularly preferred embodiment of said apparatus is disclosed in U.S. Pat. No. 5,718,764, the contents of which are incorporated herein by reference.

In a particular embodiment of the process according to the invention said process comprises a combination of a fluid-bed coating and drying of the particles whereby a first layer of coating material is applied to the particles at the bottom of the fluid-bed. The coated particles then rise through one or several draft tubes mounted vertically in the fluid-bed wherein the air-flow is increased compared to outside the tubes. As the coated particles rise through the tubes they will dry and after leaving the tubes the particles will slowly drift to the bottom of the fluid-bed where they will reenter the draft tubes for further coating. Since the coated particles are dried in said tubes, less agglomeration and consequently more evenly coated particles are obtained.

U.S. Pat. No. 5,236,503 describes a fluid-bed Wurster coater, in which one or more draft tubes, each containing a nozzle, are mounted vertically in the fluid-bed.

In one embodiment according to the invention the fluid-bed is a bottom spray fluid-bed with one or more draft tubes mounted vertically in the fluid-bed and equipped with a TFN or PTFN nozzle in each tube.

In a further embodiment of the process according to the invention the coating chamber is a fluid-bed having a container and a circle of guide vanes, e.g. as disclosed in EP 0541759B1, EP 0436787B1, EP 0370167B1, and EP 0212397A2, all to Hüttlin.

The coating should encapsulate the core particle by forming a continuous homogenous layer.

The coated particle will typically be between 50 to 2000 microns. When the particle is used in detergents it will usually be between 400 to 700 microns and when used within the baking industry it will usually be between 50 to 200 microns.

Compositions Comprising the Coated Particle and Their Application

The invention also relates to compositions comprising the coated particles of the invention. The composition may be any composition, but particularly the compositions may be those intended for use in the food, baking and/or detergent industry. Accordingly the composition may be a food, baker's flour, dough or detergent composition or an additive to be incorporated in such compositions. Also the invention encompasses the use of the composition, e.g. for improving foodstuffs such as bread or for cleaning an object such as a cellulose containing fabric.

Baking

In a special embodiment of the invention we have found that our development of coated particles comprising an active is useful in baking industry.

Within the flour mill and the baking industry the use of actives, such as enzymes, is well established. Accordingly the invention provides baking compositions comprising the coated particles of the invention, in particular dough improver compositions or flour compositions comprising the dough improver.

When using enzymes in the baking industry certain enzyme activities are preferred. Flour has varying content of amylases leading to differences in the baking quality. Addition of amylases can be necessary in order to standardize the flour. Amylases and pentosanases generally provide sugar for the yeast fermentation, improve the bread volume, retard retrogradation, and decrease the staling rate and stickiness that results from pentosan gums. Examples of carbohydrases is given below.

Certain maltogenic amylases can be used for prolonging the shelf life of bread for two or more days without causing gumminess in the product. Selectively modifies the gelatinized starch by cleaving from the non-reducing end of the starch molecules, low molecular weight sugars and dextrins. The starch is modified in such a way that retrogradation is less likely to occur. The produced low-molecular-weight sugars improve the baked goods water retention capacity without creating the intermediate-length dextrins that result in gumminess in the finished product. The enzyme is inactivated during bread baking, so it can be considered a processing aid, which does not have to be declared on the label.

The bread volume can be improved by fungal alpha-amylases, which further provide good and uniform structure of the bread crumb.

Said alpha-amylases are endoenzymes that produce maltose, dextrins and glucose. Cereal and some bacterial alpha-amylases are inactivated at temperatures above the gelatinization temperature of starch, therefore when added to wheat dough it results in a low bread volume and a sticky bread interior. Fungamyl has the advantage of being thermolabile and is inactivated just below the gelatinization temperature.

Enzyme preparations containing a number of pentosanase and hemi-cellulase activities can improve the handling and stability of the dough, and improves the freshness, the crumb structure and the volume of the bread.

By hydrolysing the pentosans fraction in flour, it will lose a great deal of its water-binding capacity, and the water will then be available for starch and gluten. The gluten becomes more pliable and extensible, and the starch gelatinize more easily. Pentosanases can be used in combination with or as an alternative to emulsifiers.

Detergents

The coated particles of the invention may also be added to and thus become a component of a detergent composition.

The detergent composition of the invention may for example be formulated as laundry detergent composition for hand or machine washings including a cleaning additive composition suitable for pre-treatment of stained fabrics or a fabric softener composition, or a detergent composition for use in general household hard surface cleaning operations, or a composition for hand or machine dishwashing operations.

In a specific aspect, the invention provides a detergent additive comprising the coated particles of the invention. The detergent additive as well as the detergent composition may comprise one or more other enzymes such as a protease, a lipase, a cutinase, an amylase, a carbohydrase, a cellulase, a pectinase, a mannanase, an arabinase, a galactanase, a xylanase, an oxidase, e.g., a laccase, and/or a peroxidase.

In general the properties of the chosen enzyme(s) should be compatible with the selected detergent, (i.e. pH-optimum, compatibility with other enzymatic and non-enzymatic ingredients, etc.), and the enzyme(s) should be present in effective amounts.

Proteases: Suitable proteases include those of animal, vegetable or microbial origin. Microbial origin is preferred. Chemically modified or protein engineered mutants are included. The protease may be a serine protease or a metallo protease, preferably an alkaline microbial protease or a trypsin-like protease. Examples of alkaline proteases are subtilisins, especially those derived from Bacillus, e.g., subtilisin Novo, subtilisin Carlsberg, subtilisin 309, subtilisin 147 and subtilisin 168 (described in WO 89/06279). Examples of trypsin-like proteases are trypsin (e.g. of porcine or bovine origin) and the Fusarium protease described in WO 89/06270 and WO 94/25583.

Examples of useful proteases are the variants described in WO 92/19729, WO 98/20115, WO 98/20116, and WO 98/34946, especially the variants with substitutions in one or more of the following positions: 27, 36, 57, 76, 87, 97, 101, 104, 120, 123, 167, 170, 194, 206, 218, 222, 224, 235 and 274.

Preferred commercially available protease enzymes include ALCALASE™, SAVINASE™, PRIMASE™, DURALASE™, ESPERASE™, AND KANNASE™ (NOVO NORDISK A/S), MAXATASE™, MAXACAL™, MAXAPEM™, PROPEPASE™, PUPAFECT™, PURAFECT OXP™, FN2™, and FN3™ (Genencor International Inc.).

Lipases: Suitable lipases include those of bacterial or fungal origin. Chemically modified or protein engineered mutants are included. Examples of useful lipases include lipases from Humicola (synonym Thermomyces), e.g. from *H. lanuginosa* (*T. lanuginosus*) as described in EP 258 068 and EP 305 216 or from *H. insolens* as described in WO 96/13580, a Pseudomonas lipase, e.g. from *P. alcaligenes* or *P. pseudoalcaligenes* (EP 218 272), *P. cepacia* (EP 331 376), *P. stutzeri* (GB 1,372,034), *P. fluorescens*, Pseudomonas sp. strain SD 705 (WO 95/06720 and WO 96/27002), *P. wisconsinensis* (WO 96/12012), a Bacillus lipase, e.g. from *B. subtilis* (Dartois et al. (1993), Biochemica et Biophysica Acta, 1131, 253–360), *B. stearothermophilus* (JP 64/744992) or *B. pumilus* (WO 91/16422).

Other examples are lipase variants such as those described in WO 92/05249, WO 94/01541, EP 407 225, EP 260 105, WO 95/35381, WO 96/00292, WO 95/30744, WO 94/25578, WO 95/14783, WO 95/22615, WO 97/04079 and WO 97/07202.

Preferred commercially available lipase enzymes include LIPOLASE™ and LIPOLASE ULTRA™ (Novo Nordisk A/S).

Amylases: Suitable amylases ($\alpha$ and/or $\beta$) include those of bacterial or fungal origin. Chemically modified or protein engineered mutants are included. Amylases include, for example, α-amylases obtained from Bacillus, e.g. a special strain of *B. licheniformis*, described in more detail in GB 1,296,839.

Examples of useful amylases are the variants described in WO 94/02597, WO 94/18314, WO 96/23873, and WO 97/43424, especially the variants with substitutions in one or more of the following positions: 15, 23, 105, 106, 124, 128, 133, 154, 156, 181, 188, 190, 197, 202, 208, 209, 243, 264, 304, 305, 391, 408, and 444.

Commercially available amylases are DURAMYL™, TERMAMYL™, FUNGAMYL™ and BAN™ (Novo Nordisk A/S), RAPIDASE™ and PURASTAR™ (from Genencor International Inc.).

Cellulases: Suitable cellulases include those of bacterial or fungal origin. Chemically modified or protein engineered mutants are included. Suitable cellulases include cellulases from the genera Bacillus, Pseudomonas, Humicola, Fusarium, Thielavia, Acremonium, e.g. the fungal cellulases produced from *Humicola insolens, Myceliophthora thermophila* and *Fusarium oxysporum* disclosed in U.S. Pat. Nos. 4,435,307, 5,648,263, 5,691,178, 5,776,757 and WO 89/09259.

Especially suitable cellulases are the alkaline or neutral cellulases having color care benefits. Examples of such cellulases are cellulases described in EP 0 495 257, EP 0 531 372, WO 96/11262, WO 96/29397, WO 98/08940. Other examples are cellulase variants such as those described in WO 94/07998, EP 0 531 315, U.S. Pat. Nos. 5,457,046, 5,686,593, 5,763,254, WO 95/24471, WO 98/12307 and PCT/DK98/00299.

Commercially available cellulases include CELLUZYME™, and CAREZYME™ (Novo Nordisk A/S), CLAZINASE™, and PURADAX HA™ (Genencor International Inc.), and KAC-500(B)™ (Kao Corporation).

Peroxidases/Oxidases: Suitable peroxidases/oxidases include those of plant, bacterial or fungal origin. Chemically modified or protein engineered mutants are included. Examples of useful peroxidases include peroxidases from Coprinus, e.g. from *C. cinereus*, and variants thereof as those described in WO 93/24618, WO 95/10602, and WO 98/15257.

Commercially available peroxidases include GUARDZYME™ (Novo Nordisk A/S).

The detergent enzyme(s) may be included in a detergent composition by adding separate additives containing one or more enzymes, or by adding a combined additive comprising all of these enzymes. A detergent additive of the invention, i.e. a separate additive or a combined additive, may be formulated so as to contain one or more of the particles of the invention comprising different enzymes.

The detergent composition of the invention may be in any convenient dry form, e.g., a bar, a tablet, a powder, a granule or a paste. It may also be a liquid detergent, in particular non-aqueous liquid detergent.

The detergent composition comprises one or more surfactants, which may be non-ionic including semi-polar and/or anionic and/or cationic and/or zwitterionic. The surfactants are typically present at a level of from 0.1% to 60% by weight.

When included therein the detergent will usually contain from about 1% to about 40% of an anionic surfactant such as linear alkylbenzenesulfonate, alpha-olefinsulfonate, alkyl sulfate (fatty alcohol sulfate), alcohol ethoxysulfate, secondary alkanesulfonate, alpha-sulfo fatty acid methyl ester, alkyl- or alkenylsuccinic acid or soap.

When included therein the detergent will usually contain from about 0.2% to about 40% of a non-ionic surfactant such as alcohol ethoxylate, nonylphenol ethoxylate, alkylpolyglycoside, alkyldimethylamineoxide, ethoxylated fatty acid monoethanolamide, fatty acid monoethanolamide, polyhydroxy alkyl fatty acid amide, or N-acyl N-alkyl derivatives of glucosamine ("glucamides").

The detergent may contain 0–65% of a detergent builder or complexing agent such as zeolite, diphosphate, triphosphate, phosphonate, carbonate, citrate, nitrilotriacetic acid, ethylenediaminetetraacetic acid, diethylenetriaminepentaacetic acid, alkyl- or alkenylsuccinic acid, soluble silicates or layered silicates (e.g. SKS-6 from Hoechst).

The detergent may comprise one or more polymers. Examples are carboxymethylcellulose, poly(vinylpyrrolidone), poly(ethylene glycol), poly(vinyl alcohol), poly(vinylpyridine-N-oxide), poly(vinylimidazole), polycarboxylates such as polyacrylates, maleic/acrylic acid copolymers and lauryl methacrylate/acrylic acid copolymers.

The detergent may contain a bleaching system, which may comprise a $H_2O_2$ source such as perborate or percarbonate, which may be combined with a peracid-forming bleach activator such as tetraacetylethylenediamine or nonanoyloxybenzenesulfonate. Alternatively, the bleaching system may comprise peroxyacids of e.g. the amide, imide, or sulfone type.

The enzyme(s) of the detergent composition of the invention may be stabilized using conventional stabilizing agents, e.g., a polyol such as propylene glycol or glycerol, a sugar or sugar alcohol, lactic acid, boric acid, or a boric acid derivative, e.g., an aromatic borate ester, or a phenyl boronic acid derivative such as 4-formylphenyl boronic acid, and the composition may be formulated as described in e.g. WO 92/19709 and WO 92/19708.

The detergent may also contain other conventional detergent ingredients such as e.g. fabric conditioners including clays, foam boosters, suds suppressors, anti-corrosion agents, soil-suspending agents, anti-soil redeposition agents, dyes, bactericides, optical brighteners, hydrotropes, tarnish inhibitors, or perfumes.

It is at present contemplated that in the detergent compositions any enzyme, may be added in an amount corresponding to 0.01–100 mg of enzyme protein per liter of wash liquor, preferably 0.05–5 mg of enzyme protein per liter of wash liquor, in particular 0.1–1 mg of enzyme protein per liter of wash liquor.

The enzyme of the invention may additionally be incorporated in the detergent formulations disclosed in WO 97/07202, which is hereby incorporated as reference.

EXAMPLES

Example 1

Uncoated Termamyl (an amylase) granulate was produced as described in U.S. Pat. No. 4,106,991 example 1 with the following exceptions:

Sodium sulfate was used in stead of sodium chloride as filler material

The enzyme concentrate contained also a carbohydrate binder (Glucidex) and sodium thiosulfate as an antioxidant.

Two granulates were produced by coating the above uncoated granulate in a mixer (as described in U.S. Pat. No. 4,106,991 Example 22) with:

A: 7.0% PEG 4000 and 0.7% Glycerol and powdered with 1.0% Kaolin to avoid stickiness B: 7.0% PEG 4000 and 0.7% Glycerol and 0.8% Expancel 461DE20 lightspheres. The granulate was produced without any problems.

The density of the coating materials are:
PEG 4000: 1.22 g/ml
Glycerol: 1.26 g/ml
Expancel 461DE20: 0.07 g/ml In the coating mixture of granulate B the volume fraction of Expancel (or the gas volume fraction) is approximately 64%.

Example 2

The production of foam according to the invention was tested using a coating feed consisting of:
- 12.5 kg polyvinyl alcohol (PVA) (Moviol 4–88 obtainable from Hoechst, Germany) as polymer
- 6.25 kg glycerol (99.5%) as plastisiser
- 32.25 kg $H_2O$ (demineralised) as solvent The polymer was slowly dissolved in the water/glycerol mixture by heating for one hour at 85° C.

The set-up used consisted of a low-pressure pump connected to a high-pressure pump with a gas sparger in between. The coating feed was atomised using a pressure two-fluid nozzle (PTFN) or an internal two-fluid nozzle (TFN). $CO_2$-gas could be injected through the sparger. The pressure in the piping between the two pumps could be adjusted up to a maximum pressure of $10^6$ Pa. The feed rate of $CO_2$-gas was 312 g/h.

Using the PTFN and a feed rate of 30–35 kg/hour, it was possible to get atomisation of the coating feed at an atomisation air consumption of 90–100 kg/hour. Atomisation could not be achieved using only pressure (hydraulic) atomisation. Robust foam was produced having a bulk wet density of 0.50 g/ml.

Using an internal mixing TFN and a feed rate of 30–35 kg/hour, it was possible to get atomisation of the coating feed at an atomisation air consumption of 60–70 kg/hour. Robust foam was produced having a bulk wet density of 0.50 g/ml.

The invention claimed is:

1. A coated enzyme particle comprising a coating comprising a solid coating material and a gas phase component applied to a core particle comprising an enzyme.

2. The particle of claim 1, wherein the gas phase component constitutes at least 20% by volume of the coating material.

3. The particle of claim 1, wherein the gas phase component constitutes at least 40% by volume of the coating material.

4. The particle of claim 1, wherein the gas phase component constitutes at least 60% by volume of the coating material.

5. The particle of claim 1, wherein the gas phase component constitutes at least 80% by volume of the coating material.

6. The particle of claim 1, wherein the coating material including the gas phase component has a true density below $0.8 g/cm^3$.

7. The particle of claim 1, wherein the gas phase component is confined within a light sphere.

8. The particle of claim 1, wherein the coating comprises one or more matrix materials selected from the group consisting of waxes, polypeptides, and carbohydrate polymers.

9. The particle of claim 8, wherein the wax is a polyethylene glycol.

10. The particle of claim 8, wherein the polypeptide is selected from the group consisting of gelatine, collagen, casein, chitosan, polyaspartic acid and polyglutamic acid.

11. The particle of claim 8, wherein the carbohydrate polymer is selected from the group consisting of pectin, starch, modified starch, cellulose, modified cellulose, carrageenan, gum Arabic, acacia gum, xanthan gum, locust bean gum and guar gum.

12. The particle of claim 1, wherein the gas phase component is atmospheric air.

13. The particle of claim 1, wherein the gas phase component is carbon dioxide.

14. The particle of claim 1, wherein the gas phase component is nitrogen.

15. The particle of claim 1, wherein the gas phase component is a noble gas.

16. A detergent composition comprising the particle of claim 1.

17. A dough composition comprising the particle of claim 1.

* * * * *